Jan. 11, 1966     T. L. CHURCHILL     3,229,184
POWER SUPPLY FILTER CIRCUIT
Filed March 11, 1963

INVENTOR
THOMAS L. CHURCHILL
BY David S. Fishman
ATTORNEY

United States Patent Office 3,229,184
Patented Jan. 11, 1966

3,229,184
POWER SUPPLY FILTER CIRCUIT
Thomas L. Churchill, Glastonbury, Conn., assignor to United Aircraft Corporation, East Hartford, Conn., a corporation of Delaware
Filed Mar. 11, 1963, Ser. No. 264,142
11 Claims. (Cl. 321—10)

This invention relates to a filter circuit for a D.C. power supply. More particularly, this invention relates to a D.C. power supply filter circuit for a variable high current supply, especially suitable for portable power supplies, in which the size and weight requirement of the filter inductor are greatly reduced without appreciably affecting voltage regulation.

In a rectified power supply the conventional passive, high current, D.C. filter usually includes an iron core series inductor followed by a parallel capacitor, the resulting circuit forming a voltage divider at the ripple frequencies it is desired to eliminate. The conventional filter will produce low ripple factors at moderate D.C. current levels. However, when it becomes necessary to passively filter large D.C. currents the iron core inductor becomes a major portion of the weight and volume of the entire power supply. If the average inductance requirement remains constant, the core volume and weight must increase as the square of the D.C. current requirement in order to prevent saturation of the core by magnetization from the D.C. component of the current.

Prior attempts at solving the problems of filtering D.C. power supplies and reducing the size of the iron core inductor have involved the bucking of ripple voltages and the reduction of the net D.C. magnetization of the iron core inductor. However, these previous approaches to the problem have entailed phase shifting networks and have resulted in power supply systems which have serious voltage regulation problems and which are very unsuitable for variable power supplies.

The present invention reduces the net D.C. magnetization of the iron core inductor by means of a practical filter circuit which neither involves ripple voltage bucking nor phase shifting, and which does not increase voltage regulation problems. Thus, in the present invention the conventional iron core inductor of a filter circuit for a power rectifier is replaced by the primary winding of a step-up transformer. The secondary winding of the transformer forms part of an auxiliary circuit and is connected on one side to a high impedance to the ripple frequency from the rectifier in the form of a parallel tuned circuit in the auxiliary circuit. A source of auxiliary direct current, preferably an auxiliary rectifier coupled to the input to the power rectifier, is in the auxiliary circuit and is connected to the parallel tuned circuit and to the other side of the secondary winding to deliver an auxiliary direct current to the secondary winding which is wound so as to generate a flux opposite to the flux generated in the primary winding by the direct current component of the power rectifier output. Thus, the magnetomotive force on the core of the transformer from the direct current in the primary winding is cancelled by an equal and opposite magnetomotive force generated by the auxiliary circuit direct current in the secondary winding. The core volume then needs only to be large enough to support the maximum ripple voltage from the power rectifier without incurring saturation while also providing a sufficiently high self-inductance to be of use as a filter element.

The present invention is effective as a variable high current supply because the auxiliary direct current in the secondary winding of the transformer is directly related to the direct current power rectifier output in the primary winding since the auxiliary current source is coupled to the input to the power rectifier. Furthermore, voltage regulation is not compromised because there is no need for phase shifting networks.

Accordingly, one object of the present invention is a novel D.C. power supply filter circuit which is operable over a wide range of high currents without incurring voltage regulation problems.

Another object of the present invention is a novel lightweight D.C. power supply which is suitable for use as a portable, variable power supply.

Another object of the present invention is a novel D.C. power supply filter circuit which reduces the size and weight of the iron core inductor of the usual filter circuit.

Other objects and advantages will be apparent from the specification and claims, and from the accompanying drawings which illustrate an embodiment of the invention.

Figure 1:
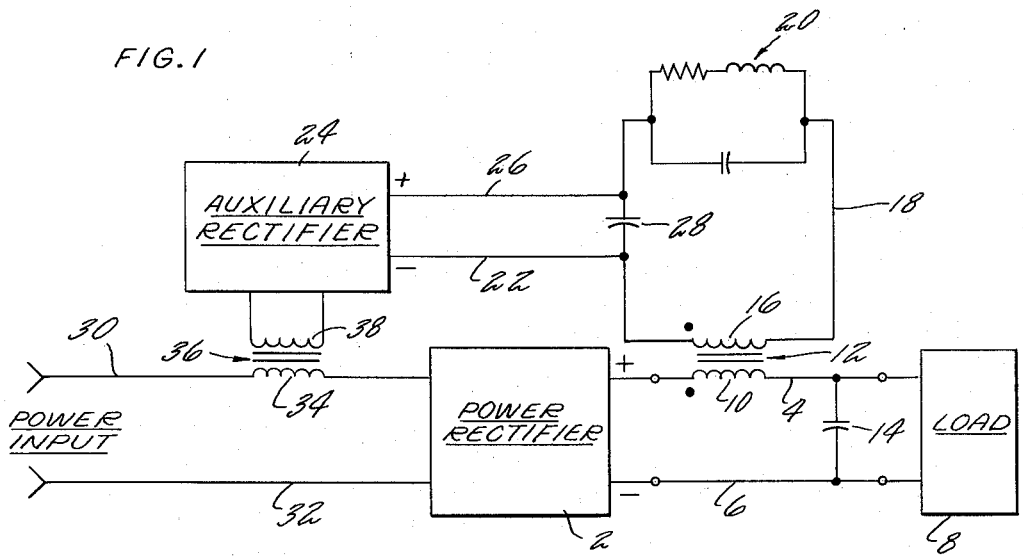
FIG. 1 is a schematic of a D.C. power supply incorporating the filter circuit of the present invention.

Referring now to FIG. 1, a power rectifier 2, which is preferably a full-wave rectifier, but which also could be a half-wave rectifier, is connected via conductors 4 and 6 to a load 8. The primary winding 10 of a step-up transformer 12 is connected between power rectifier 2 and load 8, the primary winding 10 replacing the iron core inductor of a conventional filter. A filter capacitor 14 is connected across power rectifier 2 following primary winding 10 in the conventional fashion to form an A.C. voltage divider with winding 10 to ripple frequencies in the output of rectifier 2. The secondary winding 16 of transformer 12 is connected at one end via conductor 18 to a linear parallel tuned circuit 20, and the other end of secondary winding 16 is connected via conductor 22 to the negative terminal of auxiliary rectifier 24. As is the case with power rectifier 2, auxiliary rectifier 24 is preferably a full-wave rectifier but may also be a half-wave rectifier. The positive terminal of auxiliary rectifier 24 is connected via conductor 26 to parallel tuned circuit 20. A large bypass capacitor 28 is connected across auxiliary rectifier 24. An alternating current is delivered via conductors 30 and 32 to power rectifier 2 from a source of alternating current (not shown). The alternating current delivered to power rectifier 2 may be either single phase or polyphase as desired. The primary winding 34 of a step-up transformer 36 is inserted in the input lead 30 to power rectifier 2, and the secondary winding 38 of transformer 36 is connected to supply alternating current to auxiliary rectifier 24. In this manner, auxiliary rectifier 24 is coupled to the input to power rectifier 2, and the A.C. current input to power rectifier 2 determines the D.C. current output of auxiliary rectifier 24. Auxiliary rectifier 24, capacitor 28, tuned circuit 20, secondary windings 16 and 38, and the associated conductors form an auxiliary circuit.

Step-up transformers 12 and 36 are ideally of the same turns ratio; however, the turns ratios of the transformers may be modified slightly to compensate for the leakage flux that is inherent in actual design so as to insure that the current output from auxiliary rectifier 24 is always a constant proportion of the current output from power rectifier 2. The power required by the auxiliary circuit is determined by the auxiliary circuit resistance and the auxiliary circuit D.C. current. The auxiliary circuit current is small compared to the D.C. current passing through primary winding 10, and the auxiliary circuit resistance is also small; therefore, the power consumed by the auxiliary circuit is much lower than the power consumed by load 8 with the result that the power burden due to auxiliary rectifier 24 and the circuitry connected thereto is almost negligible.

In the operation of the device shown in FIG. 1, the A.C. input to power rectifier 2 appears at the output terminal of the power rectifier as a D.C. current with one or more undesirable A.C. ripple components which are harmonics of the A.C. input to power rectifier 2, and both the A.C. and D.C. components of the power rectifier output are delivered to primary winding 10. The core of transformer 12 is subject to a magnetomotive force imposition because of the flux generated by the D.C. current in primary winding 10. However, auxiliary rectifier 24 delivers a D.C. current which is proportional to the A.C. current input to power rectifier 2, and the D.C. current output from rectifier 24 is delivered via conductor 26 and through parallel tuned circuit 20 and then through conductor 18 to secondary winding 16 of transformer 12 to generate a flux and magnetomotive force in the core of transformer 12 which is opposite to the flux and magnetomotive force originating in primary winding 10. Since transformers 36 and 12 are both of the step-up variety and have the same turns ratio, the net D.C. magnetization of the core of transformer 12 is zero. Consequently, the core volume of transformer 12 needs only to be large enough to support the maximum available ripple voltage across primary winding 10 without incurring saturation and to provide transformer 12 with sufficient self-inductance to be of use as a filter element.

Transformer 12 is of the step-up variety in order to permit the use of small D.C. currents in the auxiliary circuit. Consequently, auxiliary rectifier 24 is subject to magnified versions of any transient voltage or current surges that may occur in the power circuit. Therefore, bypass capacitor 28 is included to provide surge protection, as well as filtering, for the auxiliary rectifier.

The total equivalent input impedance of transformer 12 is approximately composed of two parallel components, (1) the self-inductance of transformer 12, and (2) the reflected secondary impedance of the auxiliary circuit. The reflected secondary impedance is the auxiliary circuit impedance divided by the square of the turns ratio of transformer 12. Since transformer 12 is a step-up transformer, the reflected secondary impedance is much smaller than the auxiliary circuit impedance. It is therefore necessary to make the auxiliary circuit impedance as large as possible without excluding the demagnetizing D.C. current in secondary winding 16 of transformer 12. This is accomplished by the use of linear parallel tuned circuit 20 which is resonant at the first harmonic frequency in the output of power rectifier 2. Thus, the D.C. output from auxiliary rectifier 24 can pass through parallel tuned circuit 20 and be delivered to secondary winding 16; but any A.C. output from secondary winding 16 which would be induced by the first harmonic ripple frequency in primary winding 10 would be dropped across the high impedance of parallel tuned circuit 20.

Figure 2:
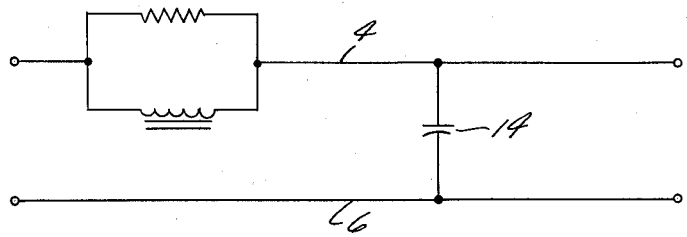
FIG. 2 is a schematic representation of the operation of the filter circuit of FIG. 1 for one ripple frequency of the power rectifier output.
Figure 3:
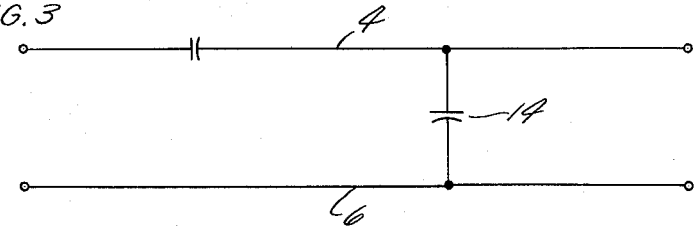
FIG. 3 is a schematic representation of the operation of the filter circuit of FIG. 1 for ripple frequencies other than that shown in FIG. 2.

As shown in FIG. 2, the total equivalent input impedance of transformer 12 is resonant at the first harmonic ripple frequency of the output of rectifier 2 and, as shown in FIG. 3, is capacitive at each successive harmonic frequency. The capacitive characteristic of the input impedance of transformer 12 for harmonics above the first harmonic is not detrimental because ordinarily only the first harmonic presents a significant problem. However, if it is also desired to suppress the second harmonic or other harmonics, the modified structure of FIG. 4 can be used.

Figure 4:
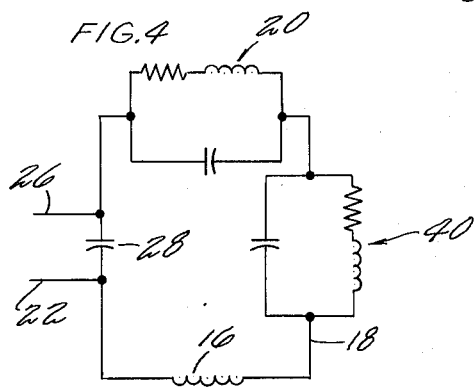
FIG. 4 is a showing of a modification of part of the circuit of FIG. 1.

As shown in FIG. 4, wherein similar elements are numbered as in FIG. 1, a second parallel tuned circuit 40 is placed in series between parallel tuned circuit 20 and secondary winding 16 of transformer 12. Parallel tuned circuit 40 would be resonant at the second harmonic ripple frequency of the output of rectifier 2 to suppress the circulation of induced A.C. components in the auxiliary circuit from the second harmonic delivered to primary winding 10, and parallel tuned circuit 40 would also make the total equivalent input impedance of transformer 12 resonant at the second harmonic as well as at the first harmonic. Of course, it will be apparent that any number of parallel tuned circuits could be added in series between parallel tuned circuit 20 and secondary winding 16 to damp out the effects of other harmonics.

In addition, the structure of FIG. 4 can be advantageous when power rectifier 2 and auxiliary rectifier 24 are not of the same type. If both rectifiers are either full-wave or half-wave rectifiers, then parallel tuned circuit 20 will be resonant at the first harmonic output of both rectifiers, and parallel tuned circuit 20 would suppress the first harmonic ripple component of the output of both rectifiers. However, if one rectifier were a full-wave rectifier and the other rectifier were a half-wave rectifier, the first harmonic ripple frequency in the outputs of the two rectifiers would be different. In that event, parallel tuned circuit 20 could be resonant at the first harmonic component of the output of one of the rectifiers such as power rectifier 2, and parallel tuned circuit 40 could be resonant at the frequency of the first harmonic component of the output of rectifier 24.

It is to be understood that the invention is not limited to the specific embodiment herein illustrated and described but may be used in other ways without departure from its spirit as defined by the following claims.

I claim:
1. In a direct current power supply, the output of which has at least one undesirable alternating current component, said power supply including
a source of alternating current,
a load, and
rectifier means connected between said source and said load,
a filter circuit comprising a transformer having a primary winding and a secondary winding, the primary winding being connected between said rectifier means and said load,
means offering a high impedance to said undesirable alternating current component,
means connecting said high impedance means to one end of the secondary winding of said transformer,
means for producing a direct current proportional to the alternating current from said source,
and means connecting said direct current producing means to the other end of said secondary winding and to said high impedance means to generate a flux in said transformer opposite to the flux generated by the current in said primary winding.

2. A filter circuit as in claim 1 wherein said high impedance means includes a parallel circuit tuned to the frequency of said undesirable alternating current component.

3. A filter circuit as in claim 1 wherein said transformer is a step-up transformer.

4. A filter circuit as in claim 2 including a capacitance connected between said parallel circuit and said secondary winding.

5. A filter circuit as in claim 1 wherein said current producing means includes rectifier means connected to said alternating current source.

6. A direct current power supply including first rectifying means, means for supplying an alternating current to said rectifying means, the output from said rectifying means having at least one undesirable alternating current component, a load, a first transformer having its primary winding connected between said rectifying means and said load, means offering a high impedance to said alternating current component, means connecting said high impedance means to one end of the secondary winding of said first transformer, a second transformer, the primary winding of said second transformer being between said alternating current supplying means and said first rectifying means, second rectifying means connected to the secondary winding of said second transformer, and means connecting said second rectifying means to said high impedance means and to the other end of the secondary winding of said first transformer to supply direct current to the secondary winding of said first transformer to generate a flux opposite to the flux generated by the direct current output of said first rectifying means in the primary winding of said first transformer.

7. A direct current power supply as in claim 6 wherein said high impedance means includes a parallel circuit tuned to the frequency of said undesirable alternating current component.

8. A direct current power supply as in claim 6 wherein each of said first and second transformers is a step-up transformer.

9. A direct current power supply as in claim 8 wherein each of said transformers has the same turns ratio.

10. A direct current power supply as in claim 6 including a capacitance connected across said second rectifying means.

11. A direct current power supply as in claim 6 including a capacitance connected across said first rectifying means after the primary winding of said first transformer to form a voltage divider with said primary winding.

References Cited by the Examiner
UNITED STATES PATENTS

| | | | |
|---|---|---|---|
| 2,418,114 | 4/1947 | Frankel | 333—79 X |
| 2,630,557 | 3/1953 | Bixby | 323—45 X |
| 3,041,523 | 6/1963 | Kuba | 321—9 X |

LLOYD McCOLLUM, *Primary Examiner.*

J. C. SQUILLARO, *Assistant Examiner.*